United States Patent
Yamashita et al.

(10) Patent No.: US 8,127,788 B2
(45) Date of Patent: Mar. 6, 2012

(54) PARTS ASSEMBLY HAVING SACRIFICIAL DEFORMATION PORTION

(75) Inventors: Yutaka Yamashita, Anjo (JP);
Fumitoshi Koyama, Kariya (JP)

(73) Assignee: Advics Co., Ltd., Kariya Aichi-Pref. (JP)

( * ) Notice: Subject to any disclaimer, the term of this patent is extended or adjusted under 35 U.S.C. 154(b) by 442 days.

(21) Appl. No.: 12/407,325

(22) Filed: Mar. 19, 2009

(65) Prior Publication Data
US 2009/0242049 A1    Oct. 1, 2009

(30) Foreign Application Priority Data

Mar. 28, 2008 (JP) ................. 2008-086302
Mar. 28, 2008 (JP) ................. 2008-086645

(51) Int. Cl.
*F04B 17/00* (2006.01)
*F16K 31/06* (2006.01)
(52) U.S. Cl. ......... 137/315.03; 137/315.11; 251/129.15; 29/890.124; 29/428; 29/505; 29/520
(58) Field of Classification Search ............ 137/315.01, 137/315.03, 315.11; 251/129.15; 29/890.13, 29/890.124, 428, 437, 505, 509, 520
See application file for complete search history.

(56) References Cited

U.S. PATENT DOCUMENTS

| | | | | |
|---|---|---|---|---|
| 5,653,249 A | * | 8/1997 | Reinartz et al. | 29/890.13 |
| 5,853,017 A | * | 12/1998 | Volz et al. | 251/129.15 |
| 5,984,263 A | * | 11/1999 | Hosoya | 251/129.15 |
| 5,993,179 A | * | 11/1999 | Baur et al. | 29/888.02 |
| 6,003,838 A | * | 12/1999 | Beck | 251/129.15 |
| 7,231,797 B2 | * | 6/2007 | Rispler | 29/890.13 |

FOREIGN PATENT DOCUMENTS

JP    3281385 B2    1/1994
WO    94/01708 A1   1/1994

* cited by examiner

*Primary Examiner* — Kevin Lee
(74) *Attorney, Agent, or Firm* — Sughrue Mion, PLLC

(57) ABSTRACT

A parts assembly includes a housing including a first part assembly hole on which a first apparatus component is assembled, the first apparatus component being fixed to the housing by a caulking for forming a caulking portion by a deformation of a bearing surface of the housing on which the first apparatus component is seated. The housing includes a second part assembly hole provided in the vicinity of the caulking portion and on which a second apparatus component is assembled. The housing includes a sacrificial deformation portion deformed by a force applied to the housing when the bearing surface is deformed by the caulking, the sacrificial deformation portion attenuating a force propagated to a portion including the second part assembly hole where the second apparatus component is assembled.

14 Claims, 15 Drawing Sheets

US 8,127,788 B2

PARTS ASSEMBLY HAVING SACRIFICIAL DEFORMATION PORTION

CROSS REFERENCE TO RELATED APPLICATIONS

This application is based on and claims priority under 35 U.S.C. §119 to Japanese Patent Application No. 2008-086302, filed on Mar. 28, 2008 and No. 2008-086645, filed on Mar. 28, 2008, the entire contents of which are incorporated herein by reference.

FIELD OF THE INVENTION

This invention generally relates to a parts assembly such as a hydraulic unit constituted by a housing made of an aluminum alloy, or the like, on which components of an apparatus such as an electromagnetic valve for opening and closing a hydraulic passage and a pump are assembled. More particularly, this invention pertains to a parts assembly in which a component of an apparatus such as a valve part is arranged adjacent to a part assembly hole that is highly accurately formed and is fixed to the housing in a state where a portion of the housing is plastically deformed.

BACKGROUND

A known hydraulic unit for controlling a brake fluid pressure (i.e., hydraulic pressure) applied to a brake apparatus for a vehicle is mainly constituted by a housing on which a power-driven pump and an electromagnetic valve for controlling the hydraulic pressure are assembled. The hydraulic unit controls the hydraulic pressure in a wheel cylinder provided at each wheel of the vehicle by the electromagnetic valve when necessary. In addition, a motor attached to one surface of the housing drives the pump to generate the hydraulic pressure. The hydraulic pressure generated is supplied to the wheel cylinder so as to be used for repressurization after a reduction of the hydraulic pressure or for a braking hydraulic pressure upon automatic braking control.

In order to fix a part or a component such as the electromagnetic valve to the housing in the aforementioned hydraulic unit, a rivet fixing (a caulking) is applied to thereby secure the part to the housing that is plastically deformed. For example, JP3281385B discloses a hydraulic pressure control unit in which a valve housing of an electromagnetic valve is fixed to a housing (which is called a valve receiving body) that is deformed.

Although a downsizing of the hydraulic unit for controlling the brake fluid pressure has been remarkably improved, a further downsizing is strongly desired. Meanwhile, in view of saving weight, an aluminum alloy is commonly used as a material of the housing.

Because densely arranged parts at the housing are inevitable for the purpose of achieving the downsizing of the hydraulic unit, a hole on which a part is assembled (i.e., a part assembly hole) may be forcedly formed adjacent to a part that is rivet-fixed to the housing.

However, when the housing is deformed by the rivet fixing, a force added to the housing at that time is propagated to the part assembly hole formed in the vicinity of the rivet fixing portion, thereby causing the deformation of the part assembly hole. For the housing made of aluminum alloy having lesser strength than an iron-based housing, the propagation of the force is significant. In a case of a large deformation of the part assembly hole, an assembly of the part on the deformed part assembly hole may be interrupted. In addition, in a case where a sliding part such as a piston of a piston pump is assembled on the part assembly hole, the sliding part inserted into the hole may have difficulty sliding smoothly.

According to a current technology, in order to avoid such problem, a sufficient distance is secured between the rivet fixing portion and the part assembly hole of the housing (i.e., a sufficient thickness of the housing is secured between the rivet fixing portion and the part assembly hole). Therefore, a size of the housing increases, which may be a problem for further downsizing a product such as the hydraulic unit.

A need thus exists for a parts assembly which is not susceptible to the drawback mentioned above.

SUMMARY OF THE INVENTION

According to an aspect of the present invention, a parts assembly includes a housing including a first part assembly hole on which a first apparatus component is assembled, the first apparatus component being fixed to the housing by means of a caulking for forming a caulking portion by a deformation of a bearing surface of the housing on which the first apparatus component is seated. The housing includes a second part assembly hole provided in the vicinity of the caulking portion and on which a second apparatus component is assembled. The housing includes a sacrificial deformation portion deformed by a force applied to the housing when the bearing surface is deformed by means of the caulking, the sacrificial deformation portion attenuating a force propagated to a portion including the second part assembly hole where the second apparatus component is assembled.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
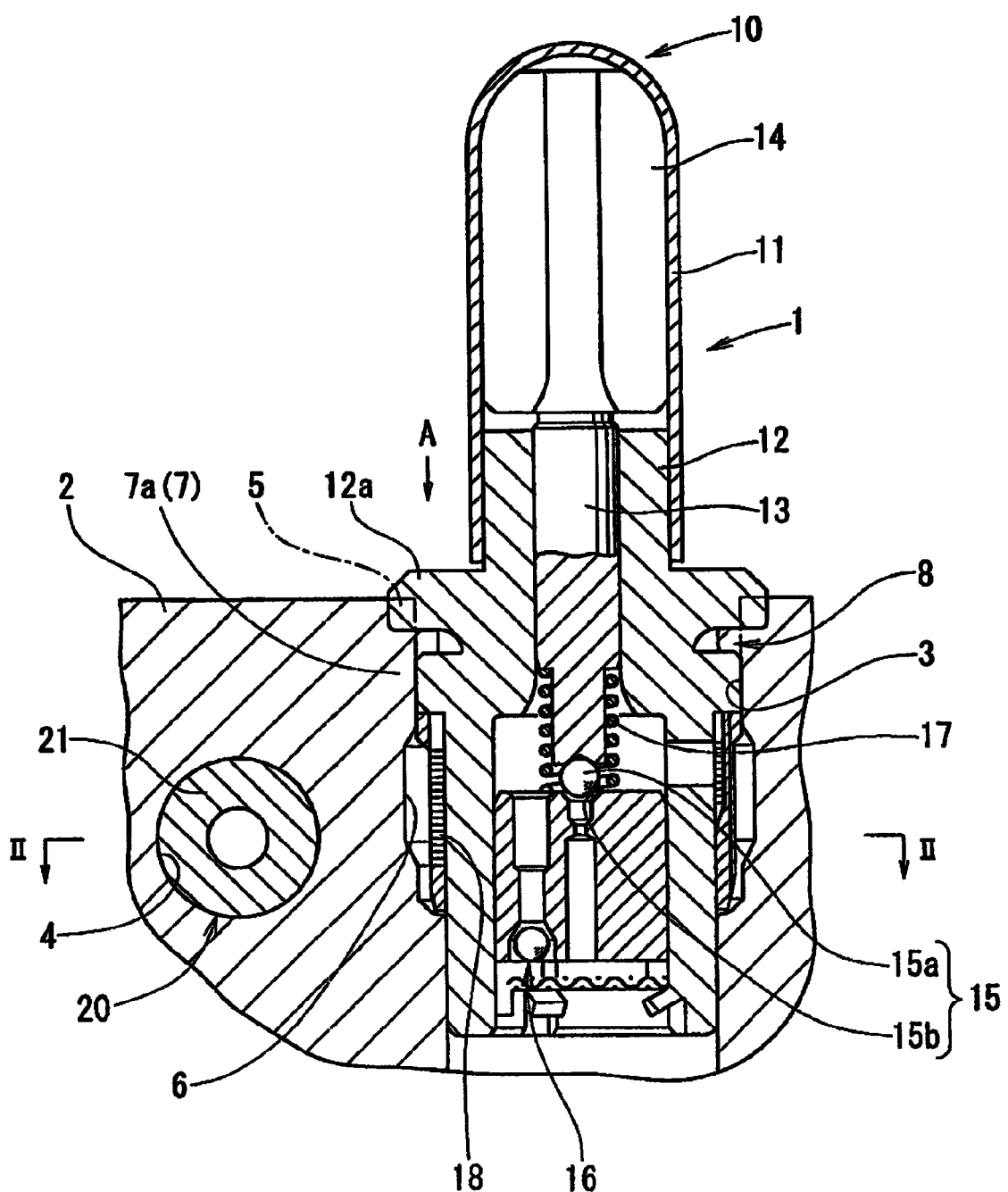
FIG. 1 is a cross-sectional view illustrating a main portion of a hydraulic unit for controlling a brake fluid pressure according to a first embodiment of the present invention.

A first embodiment of the present invention will be explained with reference to FIGS. 1 to 7. FIG. 1 illustrates a main portion of a hydraulic unit 1 serving as a parts assembly for controlling a brake fluid pressure (i.e., hydraulic pressure) according to the first embodiment. The hydraulic unit 1 includes a housing 2, an electromagnetic valve 10 serving as a first apparatus component for controlling the hydraulic pressure, and a piston pump 20 serving as a second apparatus component.

The housing 2 includes a first hole 3 serving as a first part assembly hole and a second hole 4 serving as a second part assembly hole. The electromagnetic valve 10 is assembled on the first hole 3 while the piston pump 20 is assembled on the second hole 4.

The electromagnetic valve 10 includes a valve sleeve 11, a coil for excitation arranged at an outer periphery of the valve sleeve 11, a yoke covering the coil, a valve housing 12 that also functions as a fixed iron core, and a moving iron core (movable core) 14 integrally including a valve shaft 13. The electromagnetic valve 10 further includes a valve portion 15 constituted by a valve body 15a and a valve seat 15b, and a check valve 16, all of which are provided inside of the valve housing 12, a return spring 17 biasing the valve shaft 13 (i.e., applying a return force to the valve shaft 13), and a filter 18.

In the electromagnetic valve 10 illustrated in FIG. 1, the movable core 14 is pulled down in the valve housing 12 by generation of a magnetic force by a power supply to the coil. Then, the valve body 15a held by the valve shaft 13 makes contact with the valve seat 15b, thereby closing the valve portion 15. The electromagnetic valve 10 is a known structure and thus a detailed explanation thereof will be omitted.

Figure 2:
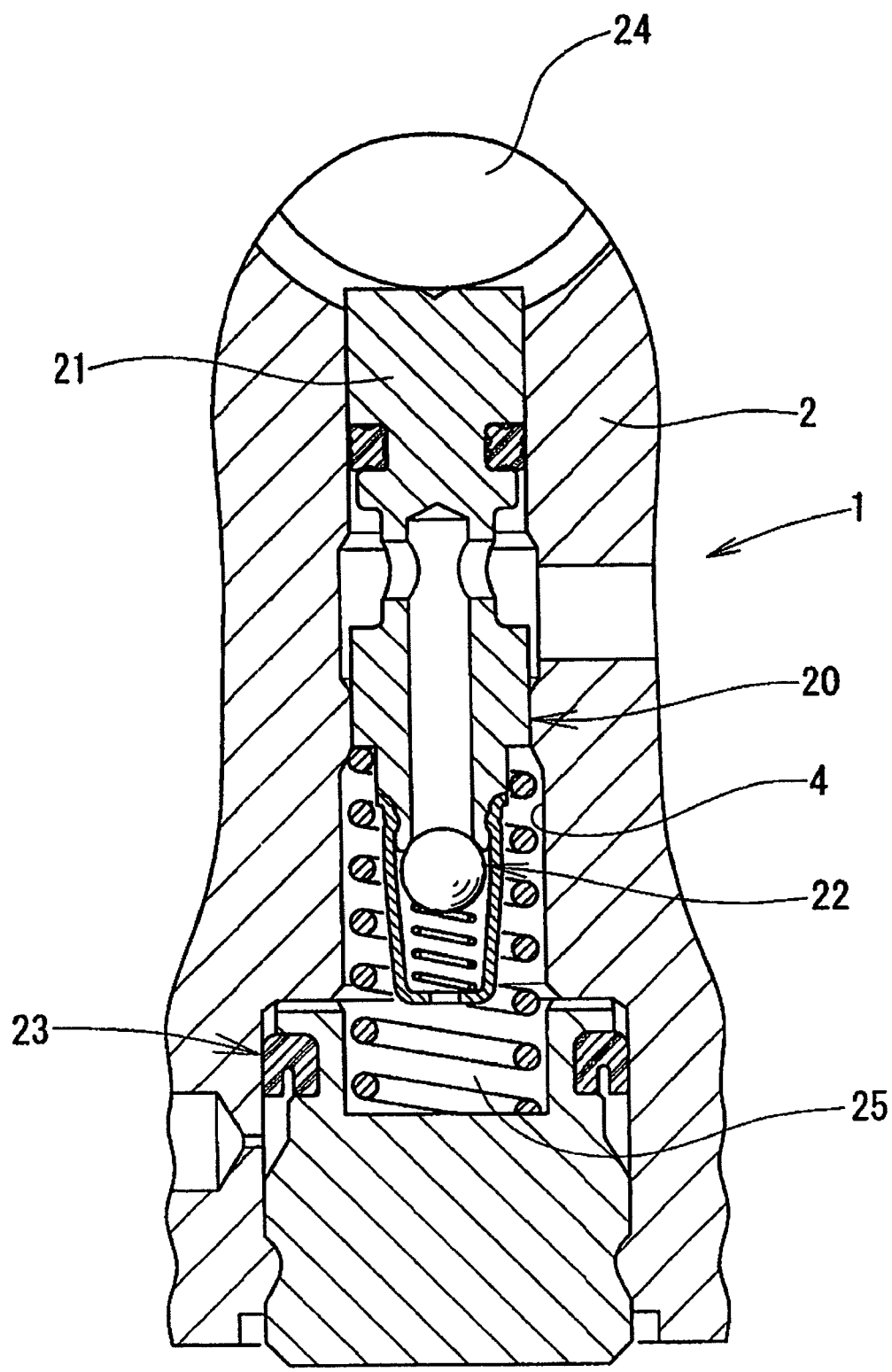
FIG. 2 is a cross-sectional view taken along the line II-II in FIG. 1 and mainly illustrating a piston pump assembled on a housing of the hydraulic unit.

As illustrated in FIG. 2, the piston pump 20 includes a piston 21 slidably inserted into the second hole 4, an inlet valve 22, and an outlet valve 23. The piston 21 is driven by a cam 24 (i.e., decentered bearing) attached to an output shaft of a motor to reciprocate so that the brake fluid is supplied to a pump chamber 25. The brake fluid supplied to the pump chamber 25 is then compressed and discharged. The piston pump 20 is a known structure and thus a detailed explanation thereof will be omitted.

The electromagnetic valve 10 is assembled on the housing 2 by the insertion of the valve housing 12 into the first hole 3 to thereby fix the electromagnetic valve 10 to the housing 2. At this time, a bearing surface 5 (i.e., a portion shown by a dashed line in FIG. 1) of the housing 2 provided at an inner edge of an entrance portion of the first hole 3 is pressurized by a seat portion 12a provided at the valve housing 12 and is then plastically deformed. The plastic-deformed portion of the bearing surface 5 engages with a groove and the like formed at an outer periphery of the valve housing 12 (i.e., caulking or rivet fixing).

At this time, a force applied to the bearing surface 5 from the seat portion 12a is propagated towards the second hole 4 formed in the vicinity of the bearing surface 5. In order to decrease the propagation of the force to the second hole 4, the hydraulic unit 1 includes a groove 6 obtained by a recess processing or machining (i.e., recess-processed groove) and formed at an inner periphery of the first hole 3 provided at the housing 2. Because the groove 6 is being provided, the bearing surface 5 and a housing walled portion 7a formed between the bearing surface 5 and the groove 6 project in a radially inward direction of the first hole 3.

The bearing surface 5 is plastically deformed while being pressurized by the valve housing 12 in a direction A shown in FIG. 1. The deformed portion of the bearing surface 5 projects towards an axial line of the first hole 3 to form a rivet fixing portion 8 (a caulking portion). At this time, because a lower side of the housing walled portion 7a is dented by means of the groove 6, the projecting housing walled portion 7a functions as a sacrificial deformation portion 7 to deform in the pressurizing direction, i.e., a downward direction in FIG. 1 (which is called "sacrificial deformation"). Accordingly, a force peripherally dispersed from the rivet fixing portion 8 is absorbed and attenuated by means of the sacrificial deformation, thereby decreasing the force propagated towards the second hole 4. As a result, the deformation of the second hole 4 that may impair a required accuracy thereof is avoidable.

Figure 3:
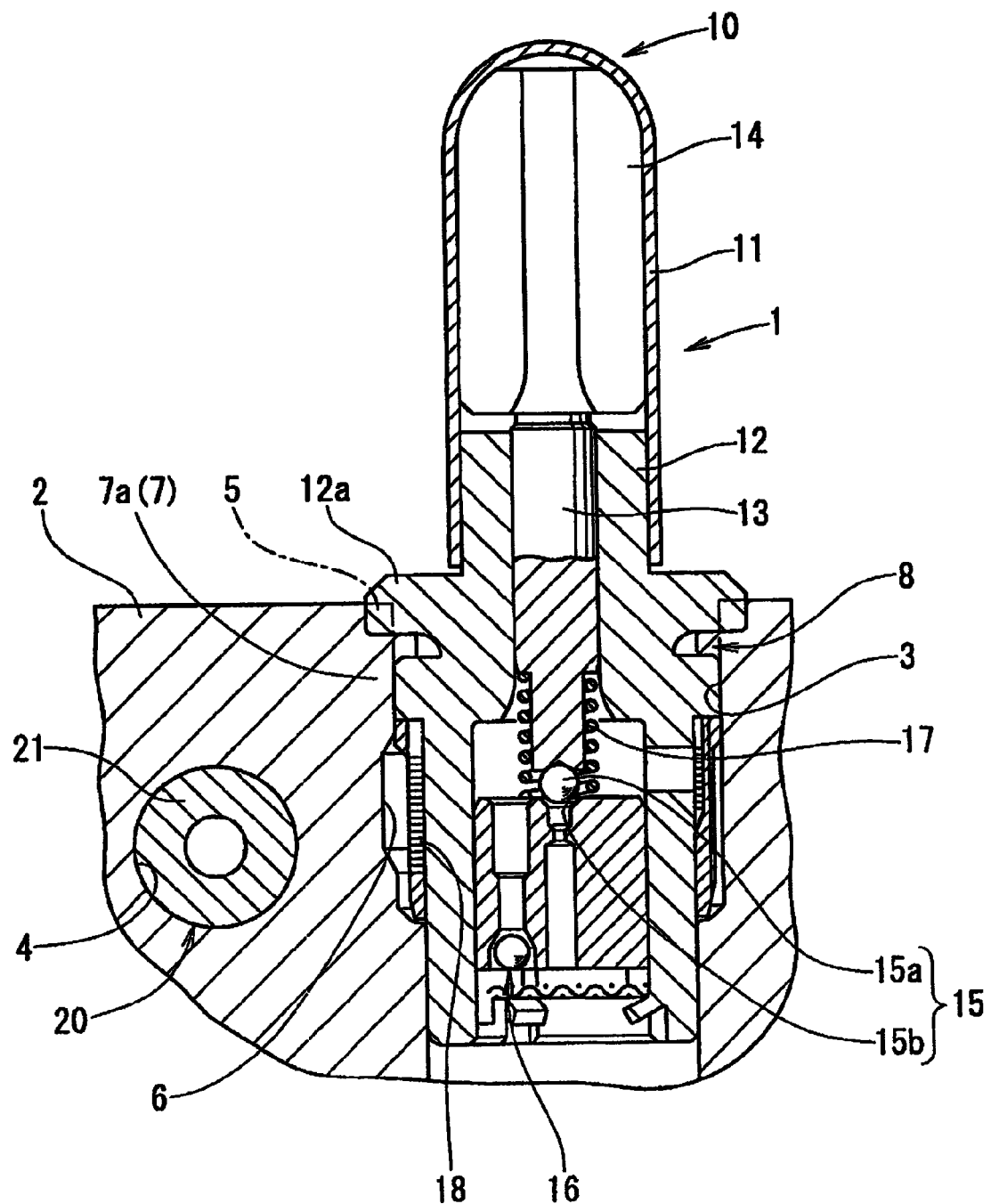
FIG. 3 is a cross-sectional view illustrating an example of a sacrificial deformation portion.

The groove 6 illustrated in FIG. 1 is formed as an annular groove, which leads to an excellent workability. Alternatively, as illustrated in FIG. 3, the groove 6 may be only partially formed at the inner periphery of the first hole 3 adjacent to or facing the second hole 4.

Figure 4:
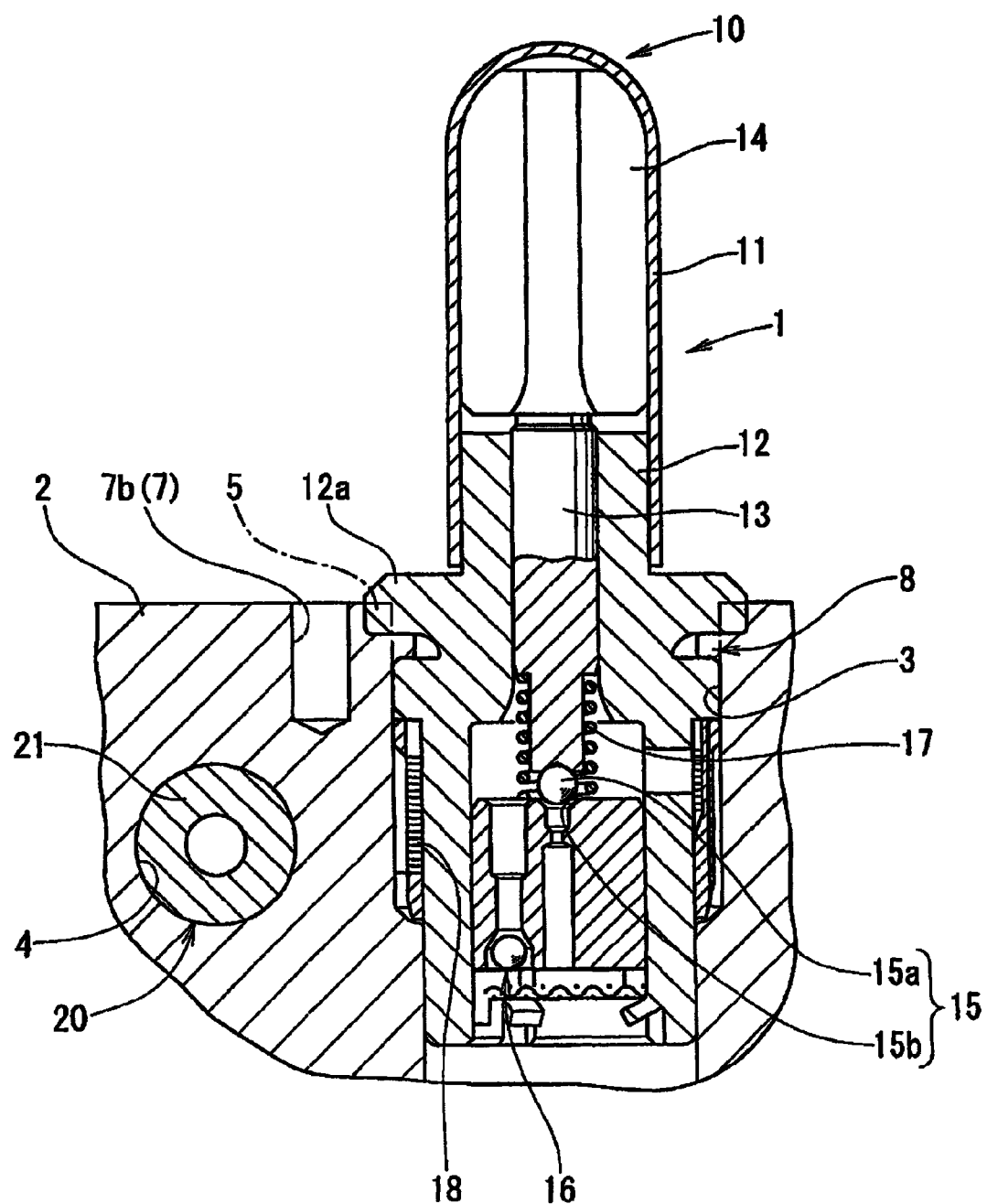
FIG. 4 is a cross-sectional view illustrating another example of the sacrificial deformation portion.
Figure 5:
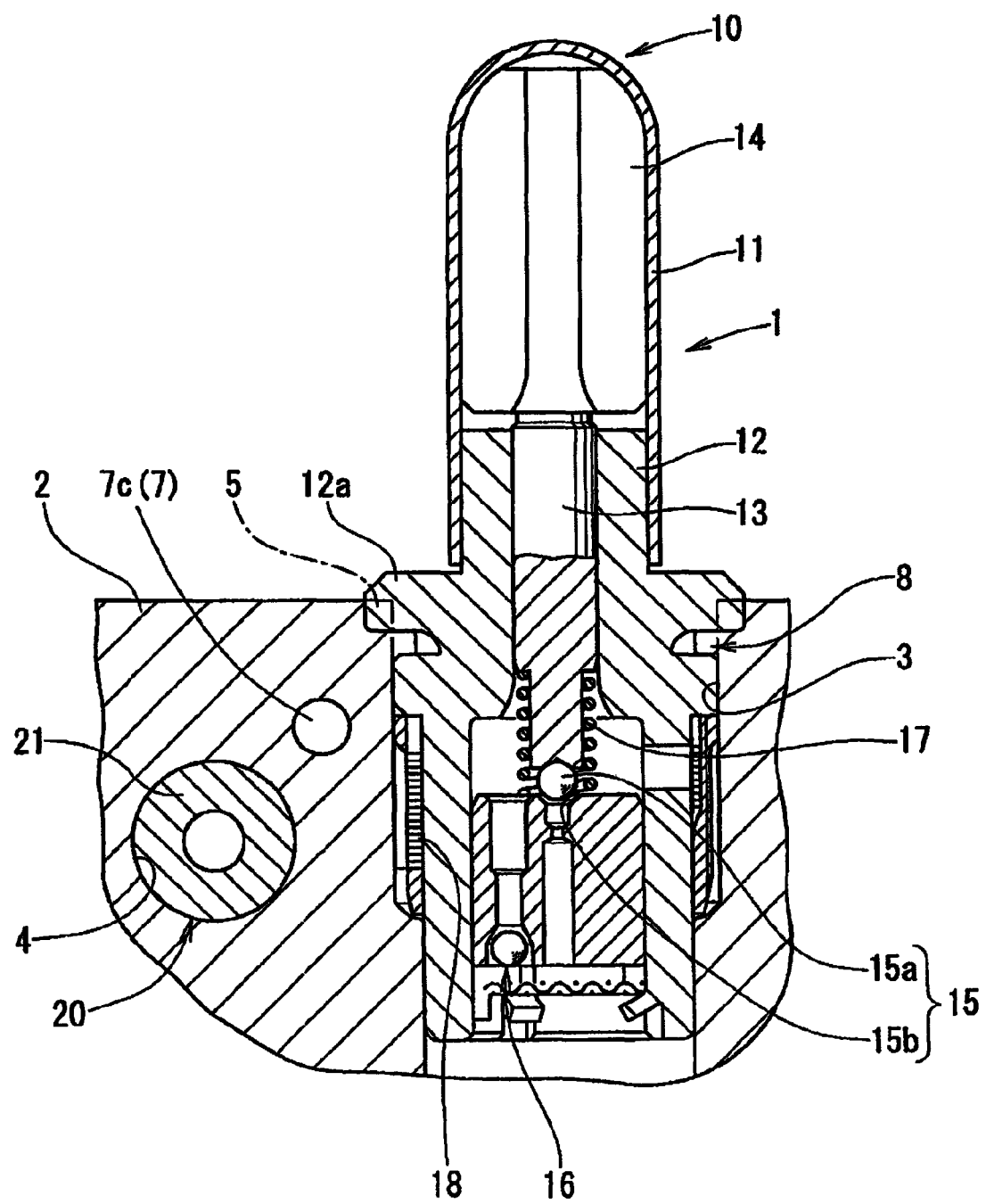
FIG. 5 is a cross-sectional view illustrating still another example of the sacrificial deformation portion.

In addition, as illustrated in FIG. 4 or FIG. 5, a hole 7b or a hole 7c is formed at an inner portion of the housing 2 between the rivet fixing portion 8 and the second hole 4 to function as the sacrificial deformation portion.

The hole 7b in FIG. 4 is formed to have an axis in parallel with the axial line of the first hole 3. The hole 7c in FIG. 5 is formed to have an axis perpendicular to the axial line of the first hole 3. Because the hole 7b is shorter in length than the hole 7c, the hole 7b is unlikely to be subject to a processing limitation and is practical as compared to the hole 7c. However, in terms of the sacrificial deformation, substantially the same effect is expected by the hole 7c as the hole 7b.

The holes 7b and 7c are both desirably formed as close as possible to the rivet fixing portion 8 within a range so as not to interrupt the plastic deformation of the bearing surface 5. The force propagated towards the second hole 4 is effectively attenuated accordingly.

In a case where a hydraulic unit is applied to the parts assembly, a hydraulic passage may be used as the hole 7b or 7c. A space inside of the housing 2 is effectively used to thereby contribute a downsizing of the hydraulic unit.

Figure 6:
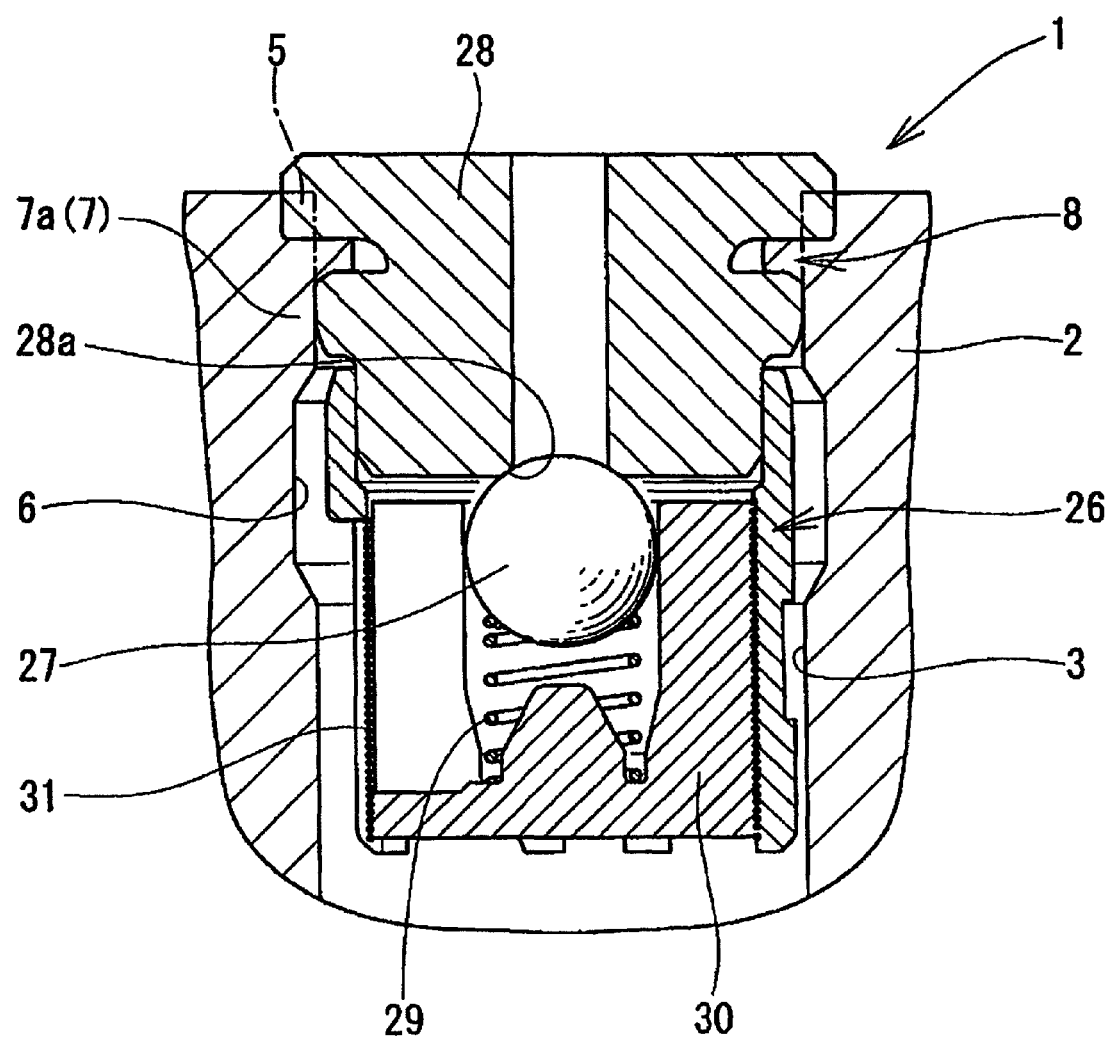
FIG. 6 is a cross-sectional view illustrating an example in which an apparatus component that is rivet-fixed to the housing is a check valve.
Figure 7:
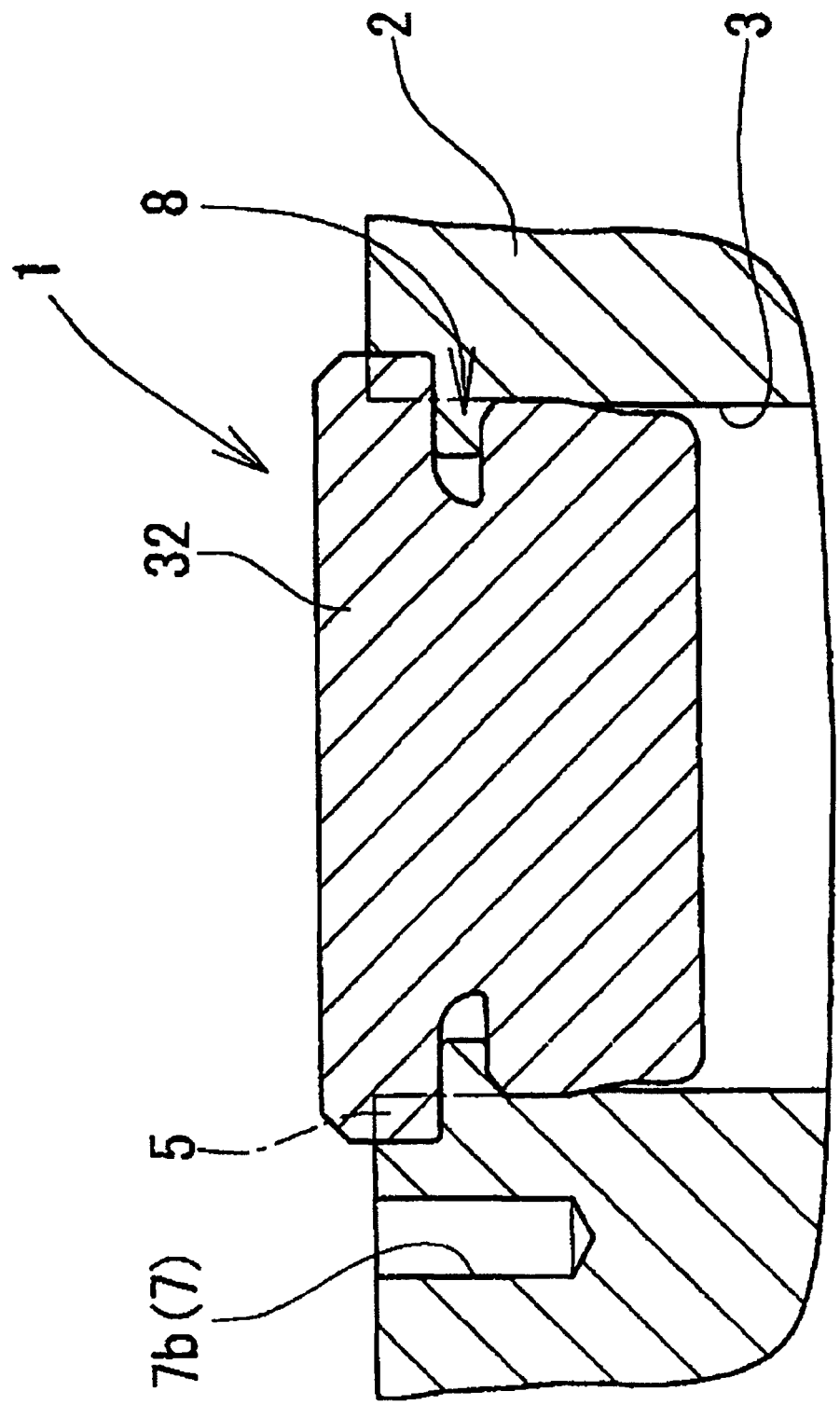
FIG. 7 is a cross-sectional view illustrating an example in which the apparatus component that is rivet-fixed to the housing is a sealing plug.

As the apparatus component assembled on the first hole 3 by means of the rivet fixing, a check valve 26 illustrated in FIG. 6, a sealing plug 32 illustrated in FIG. 7, and the like are considered besides the aforementioned electromagnetic valve 10.

As illustrated in FIG. 6, the check valve 26 includes a seat part 28 having a valve seat 28a, a valve body 27, a spring 29 applying a valve closing force to the valve body 27 (i.e., biasing the valve body 27 in a closing direction), a valve holder 30 fixed to the seat part 28, and a filter 31 filtering a liquid or fluid passing through an inside of the check valve 16. The seat part 28 is rivet-fixed to an entrance portion of the first hole 3 formed at the housing 2.

According to the aforementioned apparatus components such as the check valve and the sealing plug, in a case where the second hole 4, for which a high accuracy is required, is provided in the vicinity of the rivet fixing portion 8, the efficiency of the sacrificial deformation portion 7 is also exercised.

Figure 8:
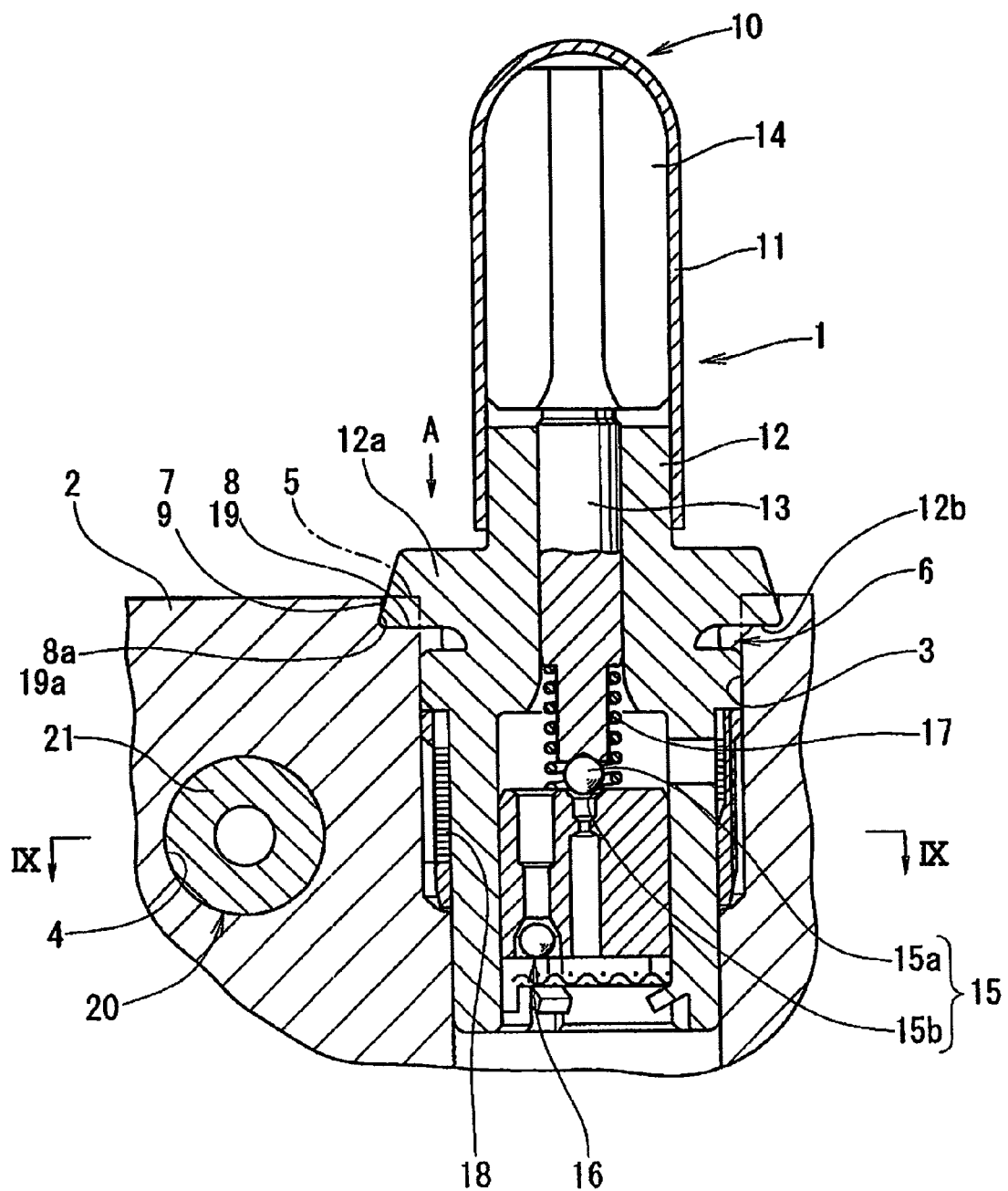
FIG. 8 is a cross-sectional view illustrating a main portion of a hydraulic unit for controlling a brake fluid pressure according to a second embodiment of the present invention.

Next, a second embodiment will be explained below with reference to FIGS. 8 to 14. Substantially the same parts or components as those of the first embodiment bear the same numbers in FIGS. 8 to 14. FIG. 8 illustrates a main portion of a hydraulic unit 1 serving as a parts assembly for controlling a brake fluid pressure (i.e., hydraulic pressure) according to the first embodiment. The hydraulic unit 1 includes a housing 2, an electromagnetic valve 10 serving as a first apparatus component for controlling the hydraulic pressure, and a piston pump 20 serving as a second apparatus component.

The housing 2 includes a first hole 3 serving as a first part assembly hole and a second hole 4 serving as a second part assembly hole. The electromagnetic valve 10 is assembled on the first hole 3 while the piston pump 20 is assembled on the second hole 4.

The electromagnetic valve 10 includes a valve sleeve 11, a coil for excitation arranged at an outer periphery of the valve sleeve 11, a yoke covering the coil, a valve housing 12 that also functions as a fixed iron core, and a moving iron core (movable core) 14 integrally including a valve shaft 13. The electromagnetic valve 10 further includes a valve portion 15 constituted by a valve body 15*a* and a valve seat 15*b*, a check valve 16 all of which are provided inside of the valve housing 12, a return spring 17 biasing the valve shaft 13 (i.e., applying a return force to the valve shaft 13), and a filter 18.

In the electromagnetic valve 10 illustrated in FIG. 8, the movable core 14 is pulled down in the valve housing 12 by generation of a magnetic force by a power supply to the coil. Then, the valve body 15*a* held by the valve shaft 13 makes contact with the valve seat 15*b*, thereby closing the valve portion 15. The electromagnetic valve 10 has a known structure and thus a detailed explanation will be omitted.

Figure 9:
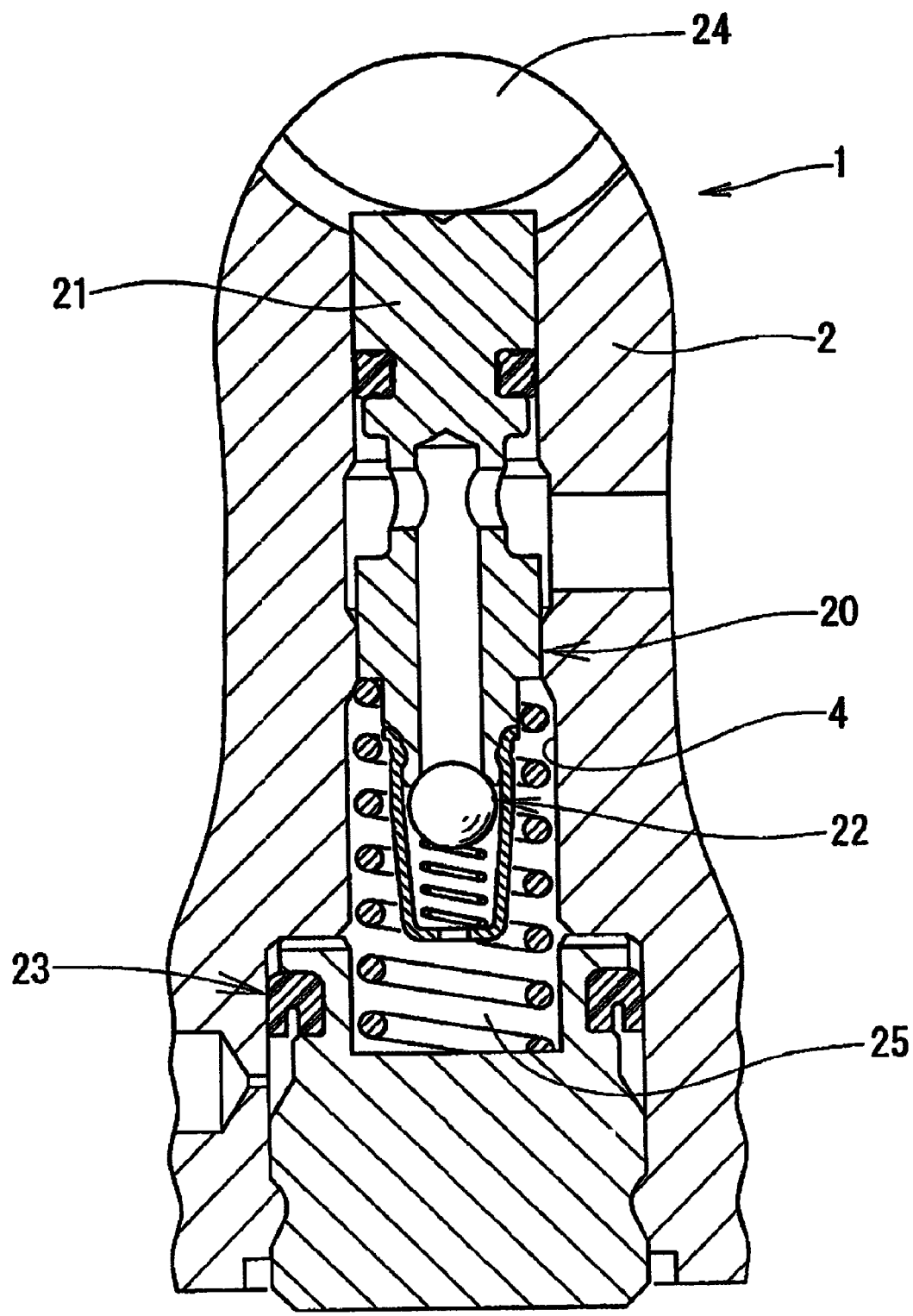
FIG. 9 is a cross-sectional view taken along the line IX-IX in FIG. 8 and mainly illustrating a piston pump assembled on a housing of the hydraulic unit.

As illustrated in FIG. 9, the piston pump 20 includes a piston 21 slidably inserted into the second hole 4, an inlet valve 22, and an outlet valve 23. The piston 21 is driven by a cam 24 (i.e., decentered bearing) attached to an output shaft of a motor to reciprocate so that the brake fluid is supplied to a pump chamber 25. The brake fluid supplied to the pump chamber 25 is then compressed and discharged. The piston pump 20 has a known structure and thus a detailed explanation will be omitted.

The electromagnetic valve 10 is assembled on the housing 2 by the insertion of the valve housing 12 into the first hole 3 to thereby fix the electromagnetic valve 10 to the housing 2. At this time, a bearing surface 5 (i.e., a portion shown by a dashed line in FIG. 8) of the housing 2 provided at an inner edge of an entrance portion of the first hole 3 is pressurized by a seat portion 12*a* provided at the valve housing 12 and is then plastically deformed. The seat portion 12*a* includes a seating side at which the seat portion 12*a* is seated on the bearing surface 5 of the housing 2. The plastic-deformed portion of the bearing surface 5 engages with a groove and the like formed at an outer periphery of the valve housing 12 (i.e., caulking or rivet fixing).

At this time, the bearing surface 5 is dented and, at the same time, a portion of the housing 2 is elastically deformed. Then, an elastic restoring force generated by the elastic deformation remains at the housing 2 to be propagated towards the second hole 4 formed in the vicinity of the bearing surface 5. In order to reduce the propagation of the force, according to the hydraulic unit 1 shown in FIG. 8, a relief portion 9 is formed around the seat portion 12*a*. The relief portion 9 is obtained by an outer peripheral surface, i.e., a side surface (first side surface) facing a radially outer side, of the seat portion 12*a* provided at the valve housing 12 is inclined in such a manner that an opposite side of the seating side of the side surface of the seat portion 12*a* is positioned closer to the axial line of the first hole 3 as compared to the seating side of the side surface of the seat portion 12*a*.

Figure 10:
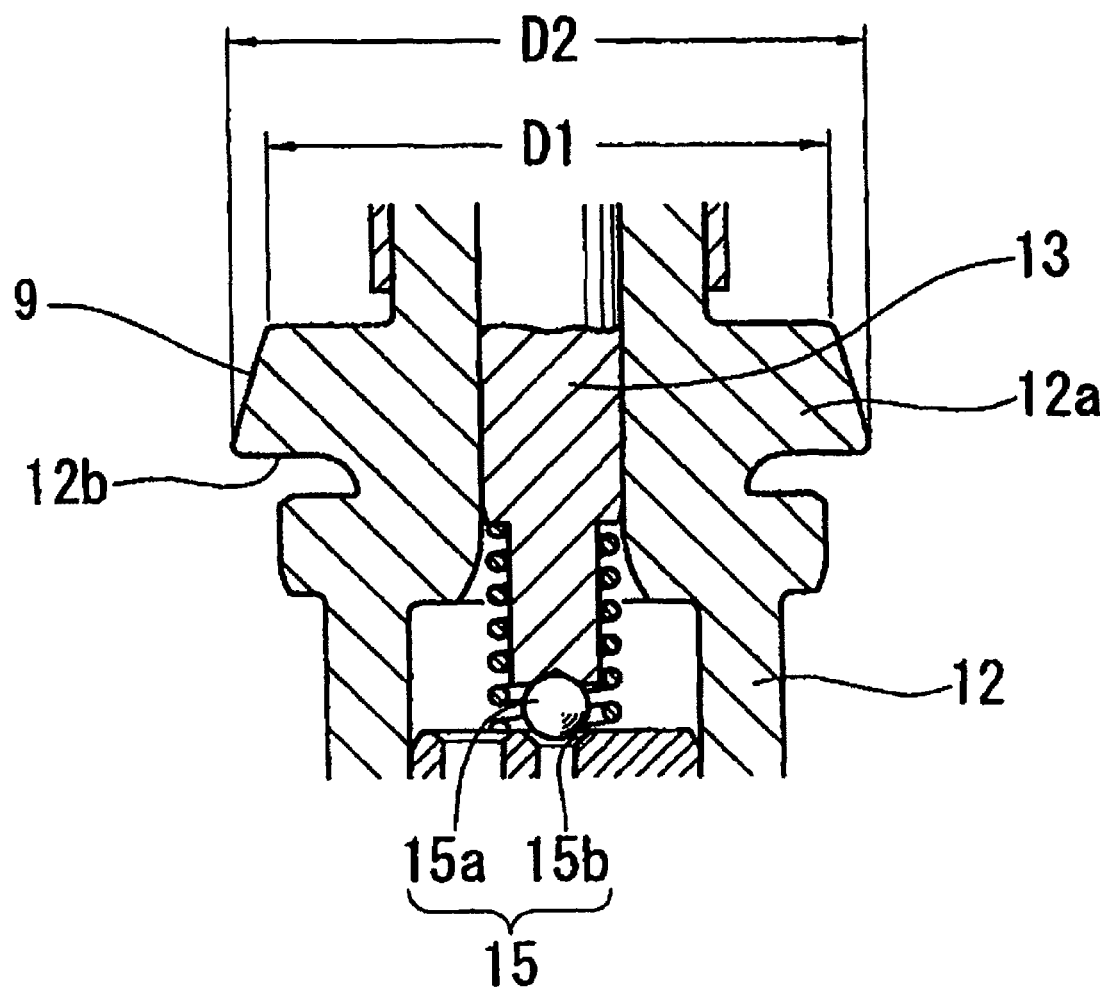
FIG. 10 is an enlarged cross-sectional view illustrating a seat portion of a valve housing shown in FIG. 8.

The seat portion 12*a* is constituted by a flange formed at the outer peripheral surface of the valve housing 12. As illustrated in FIG. 10, the side surface of the seat portion 12*a* is tapered so that a flange diameter D1 of an end portion at the opposite side of the seating side is smaller than a flange diameter D2 of an end portion at the seating side to thereby form the relief portion 9.

Figure 11:
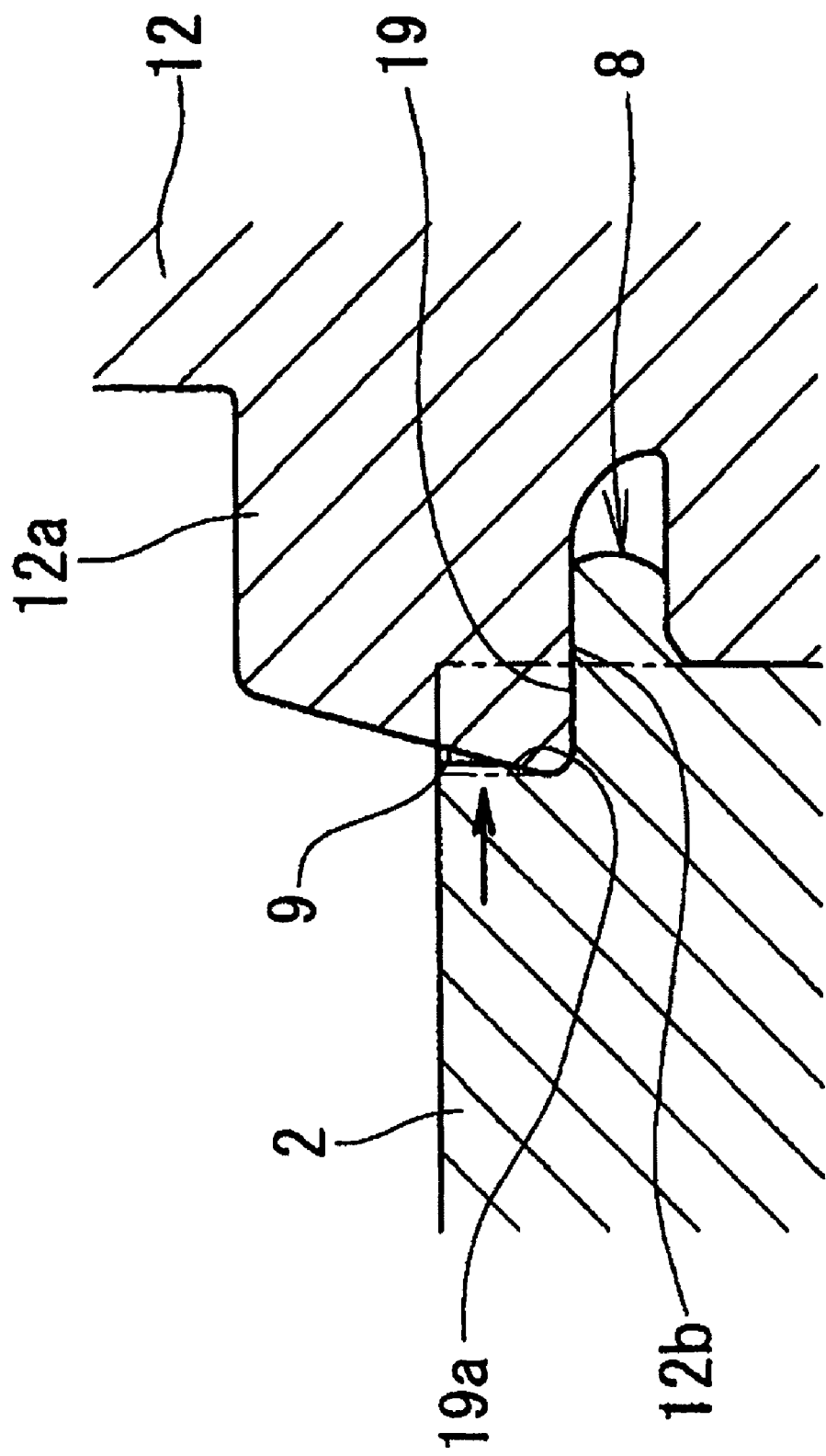
FIG. 11 is a partially enlarged cross-sectional view illustrating a state where a side surface of a bearing surface dent portion extends to be received in a relief portion of the housing.

The bearing surface 5 is deformed by being pressurized in a direction A in FIG. 8 by means of the valve housing 12. The plastic-deformed portion of the bearing surface 5 projects towards the axial line of the first hole 3, thereby forming a rivet fixing portion 8. A force generated at a side surface 19*a* (second side surface) of a bearing surface dent portion 19 obtained when the rivet fixing portion 8 is formed and facing the radially inner side of the first hole 3 causes the side surface 19*a* to be elastically restored in the radially inward direction. Then, as illustrated in FIG. 11, the side surface 19*a* is elastically restored to extend and is received in the relief portion 9 formed at the side surface of the seat portion 12*a*. Thus, a remnant of stress around the bearing surface dent portion 19 is eliminated, thereby decreasing the force propagated towards the second hole 4 from the rivet fixing portion 8. As a result, the deformation of the second hole 4 that impairs the required accuracy thereof is avoidable. In addition, the elastically restored portion of the side surface 19*a* extends to be positioned at the radially inner side of the first hole 3 relative to a radially outer diameter portion of a seat surface 12*b* of the seat portion 12*a* to engage therewith. Thus, the rivet fixing of the valve housing 12 (i.e., the electromagnetic valve 10) to the housing 2 is strengthened.

As illustrated in FIGS. 8 and 10, the relief portion 9 is formed to be tapered so that the flange diameter D1 of the end portion at the opposite side of the seating side is smaller than the flange diameter D2 of the end portion at the seating side. Thus, the shape of the relief portion 9 is prevented from being complicated and is easily formed by means of a cutting work, and the like.

Figure 12:
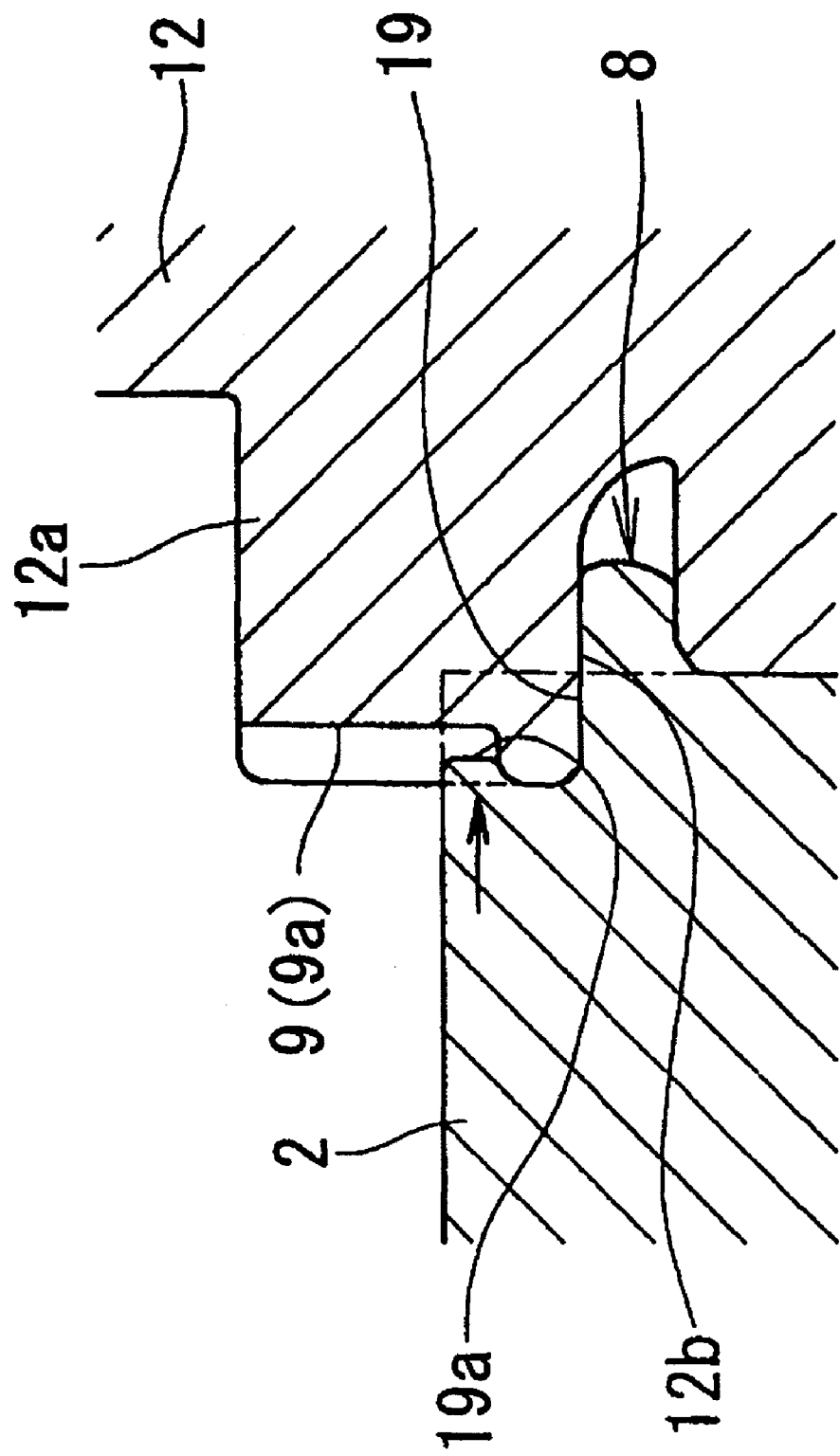
FIG. 12 is a cross-sectional view illustrating another example of the relief portion.

FIG. 12 illustrates a modified example of the relief portion 9. The relief portion 9 in FIG. 12 includes a recess portion 9*a* at the side surface of the seat portion 12*a*. The recess portion 9*a* may be formed at the opposite side of the seating side of the side surface of the seat portion 12*a* as illustrated in FIG. 12 (i.e., an upper side of the seat surface 12*b* in FIG. 12) or may be formed at a portion in connection with the seat surface 12*b*. Further, the recess portion 9*a* may be only formed at the side surface of the seat portion 12*a* adjacent to or facing the second hole 4, which still achieves the effect of the present embodiment.

Figure 13:
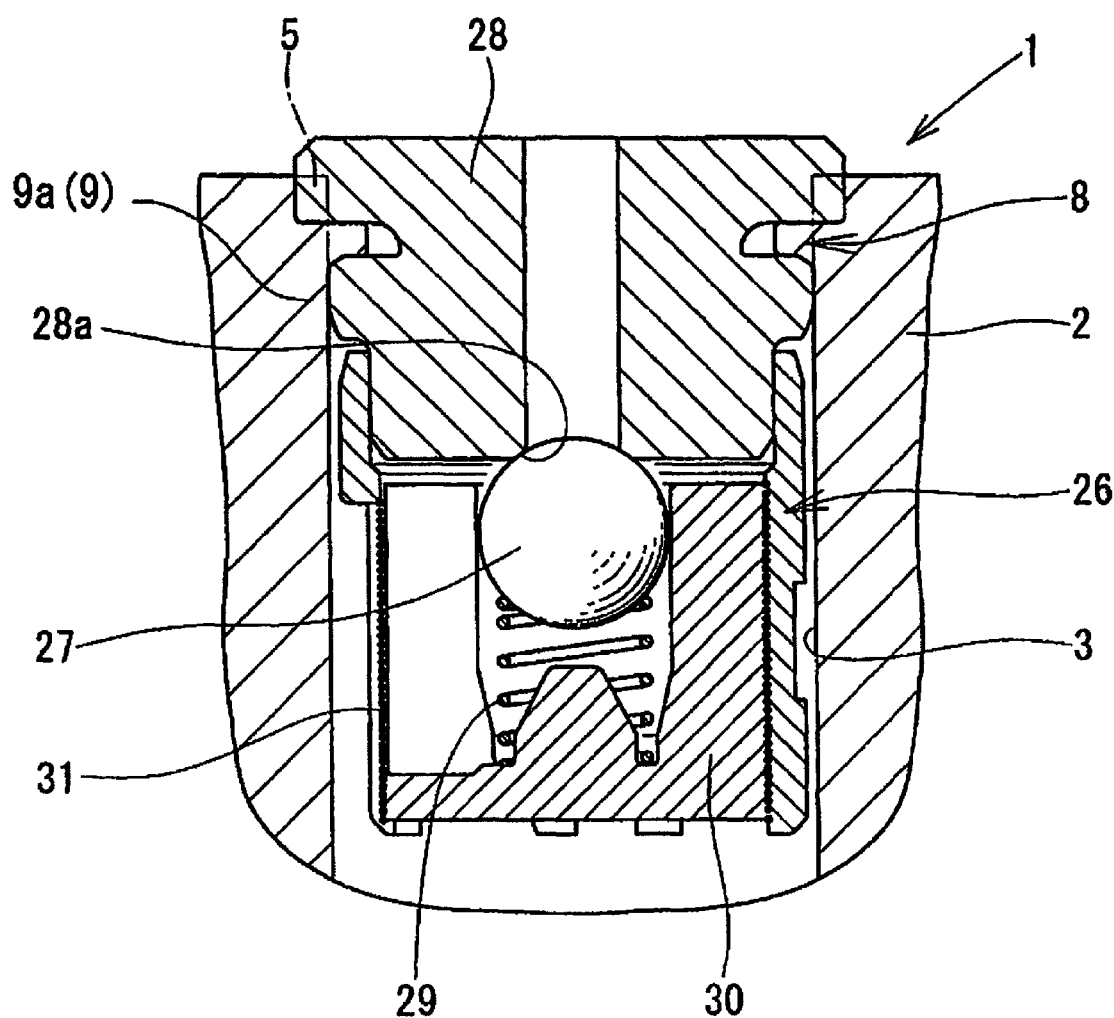
FIG. 13 is a cross-sectional view illustrating an example in which an apparatus component that is rivet-fixed to the housing is a check valve.
Figure 14:
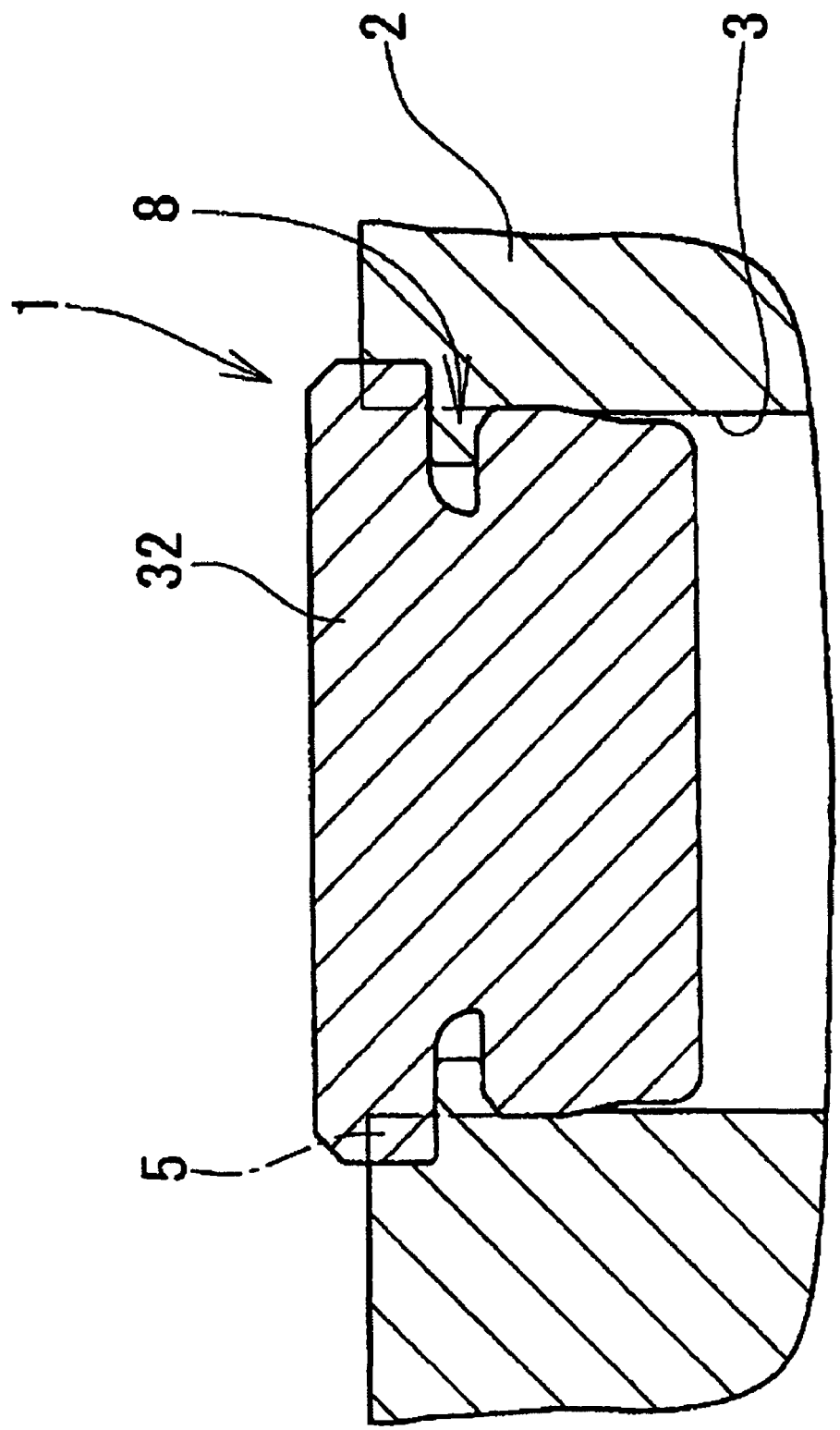
FIG. 14 is a cross-sectional view illustrating an example in which the apparatus component that is rivet-fixed to the housing is a sealing plug.

As the apparatus component assembled on the first hole 3 by means of the rivet fixing, a check valve 26 illustrated in FIG. 13, a sealing plug 32 illustrated in FIG. 14, and the like are considered besides the aforementioned electromagnetic valve 10.

As illustrated in FIG. 13, the check valve 26 includes a seat part 28 having a valve seat 28*a*, a valve body 27, a spring 29 applying a valve closing force to the valve body 27 (i.e., biasing the valve body 27 in a closing direction), a valve holder 30 fixed to the seat part 28, and a filter 31 filtering a liquid or fluid passing through an inside of the check valve 16. The seat part 28 is rivet-fixed to an entrance portion of the first hole 3 formed at the housing 2.

According to the aforementioned apparatus components such as the check valve and the sealing plug, in a case where the second hole 4, for which a high accuracy is required, is provided in the vicinity of the rivet fixing portion 8, the efficiency of the relief portion 9 is also exercised.

According to the aforementioned embodiments, besides the hydraulic unit, an air pressure controlling unit and the like are applicable to the parts assembly. In addition, besides the electromagnetic valve 10, a check valve for providing a directionality to a liquid flow, a sealing plug for sealing an entrance of the first hole 3, and the like are applicable to the apparatus component assembled on the first hole 3. The check valve, the sealing plug, and the like may be fixed to the housing 2 by means of the rivet fixing. Accordingly, the parts assembly satisfying two conditions that "a part or a component is fixed to the housing by means of the rivet fixing" and "the second hole into which a sliding part or the like is inserted is formed adjacent to the part that is rivet fixed" is a target of the embodiments.

According to the aforementioned first embodiment, the sacrificial deformation portion 7 is provided to deform when the housing 2 is deformed by the rivet fixing. Thus, the force applied to the housing 2 is absorbed by the sacrificial deformation portion 7 so that the force propagated to the second hole 4 from the bearing surface 5 of the housing 2 is reduced. As a result, the deformation of the second hole 4 because of the rivet fixing of the housing 2 in the vicinity of the second hole 4 is limited.

In a case where the recess-processed groove 6 is formed at the inner periphery of the first hole 3 so that the bearing surface 5 projects in the radially inner side of the first hole 3, and the housing walled portion 7a formed between the groove 6 and the bearing surface 5 functions as the sacrificial deformation portion 7, the groove 6 is easily processed when it is an annular groove. However, the groove 6 may be achieved by a partial dent (i.e., not an annular groove) at the inner periphery of the first hole 3 adjacent to or facing the second hole 4.

In a case where the sacrificial deformation portion 7 is achieved by the hole 7b or 7c, the hole 7b or 7c is arranged between the bearing surface 5 of the housing 2 and the second hole 4 because the effect of the sacrificial deformation portion 7 is high when the hole 7b or 7c is formed on a force propagation passage.

The effect of the sacrificial deformation portion 7 is hardly different between cases where the sacrificial deformation portion 7 is achieved by the groove 6 and where the sacrificial deformation portion 7 is achieved by the hole 7b or 7c. Thus, the hole 7b or 7c, whichever is appropriate for processing, is selectable. In addition, the hole 7b or 7c, of which orientations are different from each other, whichever is advantageous in view of processing, is selectable. The difference in orientation of the hole hardly affects a force propagation prevention effect.

In a case where the sacrificial deformation portion 7 is constituted by the hole 7b or 7c that is formed at the housing 2 and that is also used as the hydraulic passage, a space inside of the housing 2 is effectively used, thereby contributing the downsizing of the hydraulic unit, and the like. The hole 7b or 7c constituting the sacrificial deformation portion 7 is deformed by the sacrificial deformation, however, the function of the hole 7b or 7c as the hydraulic passage may not be deteriorated by such slight deformation.

Figure 15:
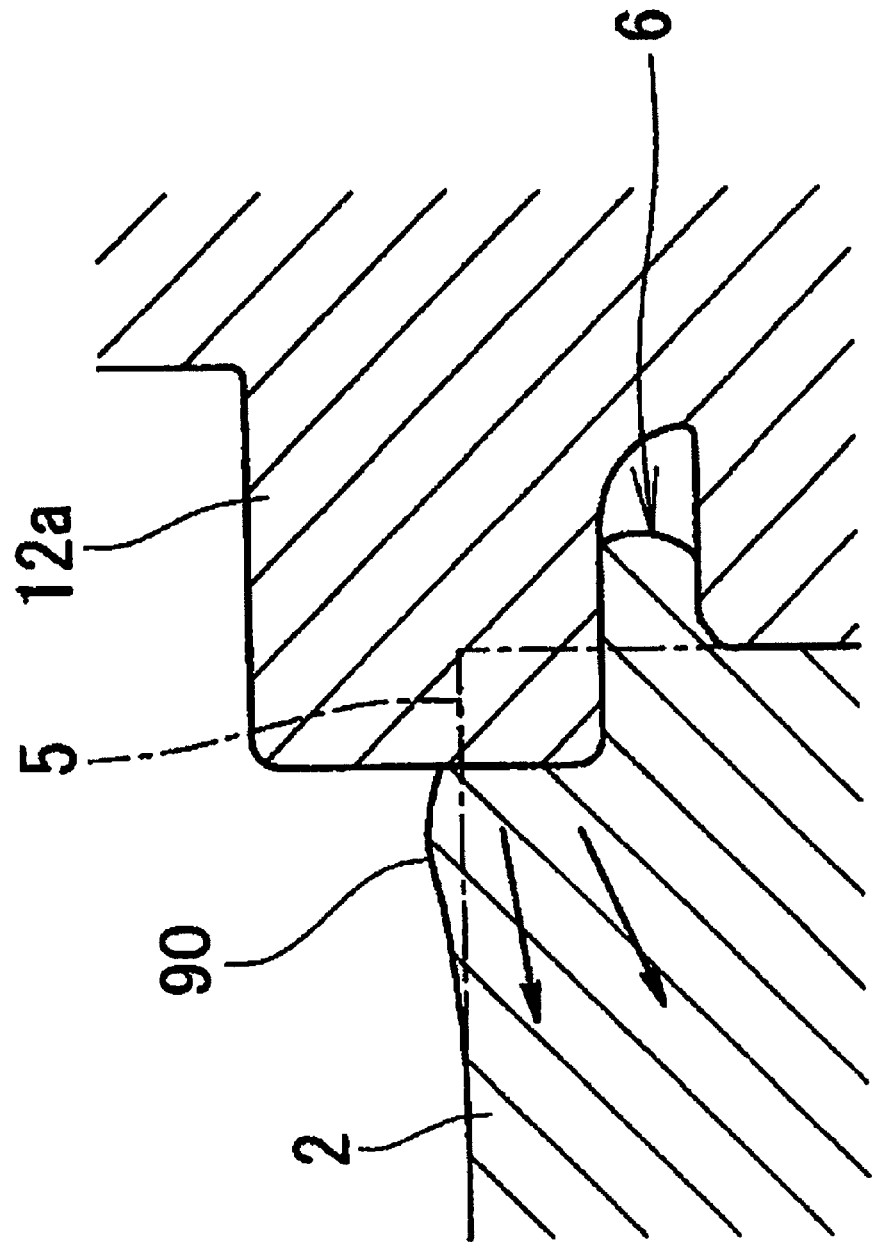
FIG. 15 is a cross-sectional view illustrating a bulging state around a bearing surface dent portion generated according to a conventional structure.

FIG. 15 is an enlarged view illustrating a portion of the bearing surface 5 and the seat portion 12a according to a known structure. When the bearing surface 5 of the housing 2 is pressurized by the seat portion 12a of the apparatus component such as the electromagnetic valve 10 for the purpose of forming the rivet fixing portion 8, the pressurized portion of the housing 2 is plastically deformed and then the bearing surface 5 is dented. At this time, a portion of the housing 2 is plastically deformed and then a walled portion around the bearing surface 5 is bulged to form a bulged portion 90 as illustrated in FIG. 15. An elastically restoring force remains at the bulged portion 90 of the housing 2 to be propagated towards the second hole 4 to thereby deform the second hole 4. On the other hand, according to the second embodiment, the relief portion 9 is formed at the radially outer side surface of the seat portion 12a of the electromagnetic valve 10 (apparatus component). Then, the side surface 19a of the bearing surface dent portion 19 of the housing 2 is elastically restored to extend and is received in the relief portion 9. Thus, the stress remaining in the vicinity of the rivet fixing portion 8 is reduced and the force propagated to the second hole 4 from the bearing surface 5 of the housing 2 is decreased, thereby limiting the deformation of the second hole 4 caused by the rivet fixing of the housing 2 in the vicinity of the second hole 4.

When the relief portion 9 obtained by the side surface of the seat portion 12a of the electromagnetic valve 10 is inclined in a predetermined direction, in particular, when the seat portion 12a is constituted by the flange of which side surface is tapered so that the flange diameter D1 of the end portion at the opposite side of the seating side is smaller than the flange diameter D2 of the end portion at the seating side, the shape of the seat portion 12a is prevented from being complicated so as to achieve an easy processing of the relief portion 9. In addition, the portion of the housing 2 is elastically restored to extend towards the radially inner side relative to the radially outer diameter portion of the seat surface 12b of the seat portion 12a to engage therewith. Thus, the rivet fixing of the electromagnetic valve 10 to the housing 2 is strengthened.

In a case where the relief portion 9 is constituted by a recess portion formed at the side surface of the seat portion 12a, the recess portion is desirably formed at a side close to the opposite side of the seating side of the seat portion 12a relative to the seat surface 12b thereof so that the elastic resorting portion of the housing 2 engages with the seat portion 12a, thereby strengthening the rivet fixing of the valve housing 12 to the housing 2.

The parts assembly further including the groove 6 provided at the inner periphery of the first hole 3, wherein the bearing surface 5 extends in the radially inner direction of the first hole 3 relative to the groove 6 and the sacrificial deformation portion 7 is constituted by the housing walled portion 7a formed between the groove 6 and the bearing surface 5.

The sacrificial deformation portion 7 is constituted by the hole 7b or 7c provided at the inner portion of the housing 2 and arranged between the rivet-fixing portion 8 (caulking portion) and the second hole 4.

The sacrificial deformation portion 7 is constituted by the hole 7b or 7c provided in the vicinity of the rivet-fixing portion 8 (caulking portion) and includes the axial line in parallel with the axial line of the first hole 3.

The sacrificial deformation portion 7 is constituted by the hole 7b or 7c provided in the vicinity of the rivet-fixing portion 8 (caulking portion) and includes the axial line perpendicular to the axial line of the first hole 3.

The electromagnetic valve 10 for opening and closing a hydraulic passage is assembled on the first hole 3 and the piston pump 21 driven by a motor is assembled on the second hole 4 to constitute a hydraulic unit for controlling a brake fluid pressure.

The parts assembly further including the hole 7b or 7c provided at the inner portion of the housing 2 and arranged between the rivet fixing portion 8 and the second hole 4, wherein the sacrificial deformation portion 7 is constituted by the hole 7b or 7c which also functions as the hydraulic passage. The sacrificial deformation portion 7 is constituted by the hole 7b or 7c which also functions as the hydraulic passage, the hole 7b or 7c provided at the inner portion of the housing 2 and arranged between the rivet-fixing portion 8 (caulking portion) and the second hole 4.

The first apparatus component is equal to one of the electromagnetic valve 10 for controlling a hydraulic pressure, the check valve 26 for providing a directionality to a liquid flow, and the sealing plug 32 for sealing an entrance of the first hole 3.

The seat portion 12a of the electromagnetic valve (first apparatus component) 10 supported at the bearing surface 5 of the housing 2 includes the relief portion 9 at the side surface facing the radially outer side, and the sacrificial deformation portion 7 is constituted by the side surface 19a of the bearing surface dent portion 19 formed at the housing 2 and extending to be received in the relief portion 9.

A portion of the side surface of the seat portion 12a of the electromagnetic valve 10 is inclined to constitute the relief portion 9, the seat portion 12a including the seating side at which the seat portion 12a is seated on the bearing surface 5 of the housing 2, the portion of the side surface near an opposite side of the seating side being positioned closer to the axial line of the first hole 3 as compared to the portion of the side surface near the seating side of the seat portion 12a.

The seat portion 12a of the electromagnetic valve 10 is constituted by the flange, and the side surface of the seat portion 12a is tapered to constitute the relief portion 9, the flange diameter D1 of the end portion of the flange at the opposite side of the seating side being smaller than the flange diameter D2 of the end portion of the flange at the seating side.

The side surface of the seat portion 12a of the electromagnetic valve 10 includes the recess portion 9a that constitutes the relief portion 9.

The recess portion 9a is arranged closer to the opposite side of the seating side of the seat portion 12a relative to the seat surface 12b of the side surface of the seat portion 12a.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parts assembly, comprising:
   a housing including a first part assembly hole on which a first apparatus component is assembled, the first apparatus component being fixed to the housing by means of a caulking for forming a caulking portion by a deformation of a bearing surface of the housing on which the first apparatus component is seated,
   the housing including a second part assembly hole provided at a portion to which a force applied to the housing when the bearing surface is caulked and deformed is propagated and on which a second apparatus component is assembled,
   the housing including a sacrificial deformation portion deformed by a force applied to the housing when the bearing surface is deformed by means of the caulking, the sacrificial deformation portion attenuating a force propagated to a portion including the second part assembly hole, further comprising a groove provided at an inner periphery of the first part assembly hole, wherein the bearing surface extends in a radially inner direction of the first part assembly hole relative to the groove and the sacrificial deformation portion is constituted by a housing walled portion formed between the groove and the bearing surface.

2. The parts assembly according to claim 1, wherein the first apparatus component is equal to one of an electromagnetic valve for controlling a hydraulic pressure, a check valve for providing a directionality to a liquid flow, and a sealing plug for sealing an entrance of the first part assembly hole.

3. The parts assembly according to claim 1, wherein a seat portion of the first apparatus component supported at the bearing surface of the housing includes a relief portion at a first side surface facing a radially outer side, and the sacrificial deformation portion is constituted by a second side surface of a bearing surface dent portion formed at the housing, the second side surface facing a radially inner side and extending to be received in the relief portion.

4. The parts assembly according to claim 3, wherein a portion of the first side surface of the seat portion of the first apparatus component is inclined to constitute the relief portion, the seat portion including a seating side at which the seat portion is seated on the bearing surface of the housing, the portion of the first side surface near an opposite side of the seating side being positioned closer to an axial line of the first part assembly hole as compared to the portion of the first side surface near the seating side of the seat portion.

5. The parts assembly according to claim 4, wherein the seat portion of the first apparatus component is constituted by a flange, and the first side surface of the seat portion is tapered to constitute the relief portion, a first diameter of an end portion of the flange at the opposite side of the seating side being smaller than a second diameter of an end portion of the flange at the seating side.

6. The parts assembly according to claim 3, wherein the first side surface of the seat portion of the first apparatus component includes a recess portion that constitutes the relief portion.

7. The parts assembly according to claim 6, wherein the recess portion is arranged closer to the opposite side of the seating side of the seat portion relative to a seat surface of the first side surface of the seat portion.

8. The parts assembly according of claim 3, wherein the first apparatus component is equal to one of an electromagnetic valve for controlling a hydraulic pressure, a check valve for providing a directionality to a liquid flow, and a sealing plug for sealing an entrance of the first part assembly hole.

9. A parts assembly, comprising:
   a housing including a first part assembly hole on which a first apparatus component is assembled, the first apparatus component being fixed to the housing by means of a caulking for forming a caulking portion by a deformation of a bearing surface of the housing on which the first apparatus component is seated,
   the housing including a second part assembly hole provided at a portion to which a force applied to the housing when the bearing surface is caulked and deformed is propagated and on which a second apparatus component is assembled, the housing including a sacrificial deformation portion deformed by a force applied to the housing when the bearing surface is deformed by means of the caulking, the sacrificial deformation portion attenuating a force propagated to a portion including the second part assembly hole, wherein the sacrificial deformation portion is constituted by a hole provided at an inner portion of the housing and arranged between the caulking portion and the second part assembly hole.

10. The parts assembly according to claim 9, wherein the sacrificial deformation portion is constituted by the hole which is provided at a portion to which a force applied to the housing when the bearing surface is caulked and deformed is propagated and which includes an axial line in parallel with an axial line of the first part assembly hole.

11. The parts assembly according to claim 9, wherein the sacrificial deformation portion is constituted by the hole which is provided at a portion to which a force applied to the housing when the bearing surface is caulked and deformed is propagated and which includes an axial line perpendicular to an axial line of the first part assembly hole.

12. A parts assembly, comprising:
a housing including a first part assembly hole on which a first apparatus component is assembled, the first apparatus component being fixed to the housing by means of a caulking for forming a caulking portion by a deformation of a bearing surface of the housing on which the first apparatus component is seated,
the housing including a second part assembly hole provided at a portion to which a force applied to the housing when the bearing surface is caulked and deformed is propagated and on which a second apparatus component is assembled,
the housing including a sacrificial deformation portion deformed by a force applied to the housing when the bearing surface is deformed by means of the caulking, the sacrificial deformation portion attenuating a force propagated to a portion including the second part assembly hole, wherein an electromagnetic valve for opening and closing a hydraulic passage is assembled on the first part assembly hole and a piston pump driven by a motor is assembled on the second part assembly hole to constitute a hydraulic unit for controlling a brake fluid pressure.

13. The parts assembly according to claim 12, wherein the sacrificial deformation portion is constituted by a hole which also functions as the hydraulic passage, the hole being provided at an inner portion of the housing and arranged between the caulking portion and the second part assembly hole.

14. A parts assembly, comprising:
a housing including a first part assembly hole on which a first apparatus component is assembled, the first apparatus component being fixed to the housing by means of a caulking for forming a caulking portion by a deformation of a bearing surface of the housing on which the first apparatus component is seated,
the housing including a second part assembly hole provided at a portion to which a force applied to the housing when the bearing surface is caulked and deformed is propagated and on which a second apparatus component is assembled,
the housing including a sacrificial deformation portion deformed by a force applied to the housing when the bearing surface is deformed by means of the caulking, the sacrificial deformation portion attenuating a force propagated to a portion including the second part assembly hole,
wherein a seat portion of the first apparatus component supported at the bearing surface of the housing includes a relief portion at a first side surface facing a radially outer side, and the sacrificial deformation portion is constituted by a second side surface of a bearing surface dent portion formed at the housing, the second side surface facing a radially inner side and extending to be received in the relief portion, wherein an electromagnetic valve for opening and closing a hydraulic passage is assembled on the first part assembly hole
and a piston pump driven by a motor is assembled on the second part assembly hole
to constitute a hydraulic unit for controlling a brake fluid pressure.

* * * * *